US008060365B2

(12) United States Patent
Itoh et al.

(10) Patent No.: US 8,060,365 B2
(45) Date of Patent: Nov. 15, 2011

(54) DIALOG PROCESSING SYSTEM, DIALOG PROCESSING METHOD AND COMPUTER PROGRAM

(75) Inventors: Nobuyasu Itoh, Yokohama (JP); Shiho Negishi, Machida (JP); Hironori Takeuchi, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 793 days.

(21) Appl. No.: 12/167,879

(22) Filed: Jul. 3, 2008

(65) Prior Publication Data
US 2009/0012787 A1 Jan. 8, 2009

(30) Foreign Application Priority Data

Jul. 3, 2007 (JP) ................................ 2007-174862

(51) Int. Cl.
*G10L 15/26* (2006.01)
(52) U.S. Cl. ........ 704/235; 704/253; 704/241; 704/237; 704/254; 704/243
(58) Field of Classification Search .................. 704/241, 704/253, 254, 243, 231, 251, 240, 235, 245, 704/257, 237, 246, 256, 252, 267
See application file for complete search history.

(56) References Cited

U.S. PATENT DOCUMENTS

| | | | | |
|---|---|---|---|---|
| 5,761,637 A * | 6/1998 | Chino | ........................... | 704/231 |
| 5,784,568 A * | 7/1998 | Needham | ....................... | 709/234 |
| 5,835,667 A * | 11/1998 | Wactlar et al. | ................. | 386/241 |
| 6,629,087 B1 * | 9/2003 | Benson et al. | ................... | 706/11 |
| 7,054,811 B2 * | 5/2006 | Barzilay | ........................ | 704/246 |
| 7,133,828 B2 * | 11/2006 | Scarano et al. | ................ | 704/251 |
| 7,478,047 B2 * | 1/2009 | Loyall et al. | ................... | 704/258 |
| 7,640,160 B2 * | 12/2009 | Di Cristo et al. | .............. | 704/257 |
| 7,809,570 B2 * | 10/2010 | Kennewick et al. | ........... | 704/257 |

(Continued)

FOREIGN PATENT DOCUMENTS

JP  2000-235475  8/2000

(Continued)

OTHER PUBLICATIONS

Morgan, W. et al. "Automatically Detecting Action Items in Audio Meeting Records" Proceedings of the 7th SIGdial Workshop on Discourse and Dialogue, pp. 96-103, Sydney, Jul. 2006.

(Continued)

*Primary Examiner* — Vijay Chawan
(74) *Attorney, Agent, or Firm* — Wolf, Greenfield & Sacks, P.C.

(57) ABSTRACT

A dialog processing system which includes a target expression data extraction unit for extracting a plurality of target expression data each including a pattern matching portion which matches an utterance pattern, which are inputted by an utterance pattern input unit and is an utterance structure derived from contents of field-independent general conversations, among a plurality of utterance data which are inputted by an utterance data input unit and obtained by converting contents of a plurality of conversations in one field; a feature extraction unit for retrieving the pattern matching portions, respectively, from the plurality of target expression data extracted, and then for extracting feature quantity common to the plurality of pattern matching portions; and a mandatory data extraction unit for extracting mandatory data in the one field included in the plurality of utterance data by use of the feature quantities extracted.

11 Claims, 12 Drawing Sheets

U.S. PATENT DOCUMENTS

| | | | |
|---|---|---|---|
| 7,949,529 B2* | 5/2011 | Weider et al. | 704/270 |
| 2005/0096906 A1* | 5/2005 | Barzilay | 704/249 |
| 2006/0149558 A1* | 7/2006 | Kahn et al. | 704/278 |
| 2006/0282317 A1* | 12/2006 | Rosenberg | 705/14 |
| 2007/0050191 A1* | 3/2007 | Weider et al. | 704/275 |
| 2007/0094005 A1* | 4/2007 | Huang et al. | 704/3 |
| 2010/0189286 A1* | 7/2010 | Katsuno | 381/122 |

FOREIGN PATENT DOCUMENTS

| | | |
|---|---|---|
| JP | 2004-333641 | 11/2004 |
| JP | 2004-333870 | 11/2004 |

OTHER PUBLICATIONS

Stolcke, A. et al. "Dialog Act Modeling for Conversational Speech".

* cited by examiner (a)
```
<utterance speaker="Agent">
  <sentence />           ← ARBITRARY NUMBER OF SENTENCES
  ...
  <sentence start = "TOPIC CHANGE" end= "WILL OR REQUEST"/>
  <sentence />
  <sentence />           ← TWO OR MORE SENTENCES FOR CONFIRMATION DETAI
  ...
  <sentence end = "CONFIRMATION"/>
  <sentence />
  ...                    ← ARBITRARY NUMBER OF SENTENCES
</utterance>
```

→ UTTERANCE STARTS
→ ARBITRARY SENTENCE (NOT ALWAYS NECESSARY)
→ SENTENCE THAT STARTS WITH "TOPIC CHANGE" AND ENDS WITH "WILL "OR "REQUEST"
→ ARBITRARY SENTENCE (TWO OR MORE SENTENCES)
→ SENTENCE THAT ENDS WITH "CONFIRMATION"
→ ARBITRARY SENTENCE (NOT ALWAYS NECESSARY)
→ UTTERANCE ENDS (b)
```
<utterance speaker="Agent">
  <sentence />
  ...                    ← ARBITRARY NUMBER OF SENTENCES
  <sentence start = "TOPIC CHANGE" end= "WILL OR REQUEST"/>
  <sentence />
  <sentence />           ← TWO OR MORE SENTENCES FOR CONFIRMATION DETAI
  ...
  <sentence />
</utterance>
```

→ UTTERANCE STARTS
→ ARBITRARY SENTENCE (NOT ALWAYS NECESSARY)
→ SENTENCE THAT STARTS WITH "TOPIC CHANGE" AND ENDS WITH "WILL" OR "REQUEST"
→ ARBITRARY SENTENCE (TWO OR MORE SENTENCES)
→ UTTERANCE ENDS

FIG. 3

DATA EXAMPLES OF STOCK EXCHANGE OVER THE PHONE
(MANDATORY UTTERANCE IS ORDER CONFIRMATION)

(a) SOREDEWA GOTYÛMONNAIYO FUKUSYO ITASIMASU. AAASAMA, KONDO HAKABU NO URITYÛMON, 5××6 NO aaaa DESU NE. DE, KOTIRA OAZUKARI NO 103 KABU IPPANKÔZA DE GOBAIKYAKU TO IUKOTO DE YOROSÎ DESYÔKA.
*(AND NOW, I WILL REPEAT THE ORDER DETAILS. MR. AAA, A SELL ORDER OF ODD LOT NEXT TIME IS aaaa OF 5×X6. AND, YOU WISH TO SELL 103 SHARES OF STOCK THAT WE HAVE HERE FROM YOUR CHECKING ACCOUNT. IS THAT CORRECT?)*

(b) DEWA NAIYO FUKUSYÔ SIMASU NODE GOKAKUNIN YOROSÎ DE SYÔKA. HAI, BBBSAMA NO KÔZA DE, HAI 1××2 NO bbbb, KOTIRA 1,000 KABU WO 501 EN, DE, NO SASINE DE BAIKYAKU, HAI, IPPANKÔZA DE, HAI, KYÔ DAKE NO BAIKYAKU DESU. HAI, SÔSIMASU TO 501,000 EN KARA OTESÛRYÔ SASIHIKAREMASU GA YOROSÎ DESUKA.
*(NOW, PLEASE CONFIRM THE DETAILS I WILL REPEAT. FROM MR. BBB'S ACCOUNT, bbbb OF 1×X2, 1000 SHARES OF STOCK WILL BE SOLD AT A LIMIT OF 501 YEN, FROM CHECKING ACCOUNT, SELL ONLY FOR TODAY. THEN, WE'LL DEDUCT COMMISSION FROM 501,000 YEN. IS THAT OK?)*

(c) SÔSIMASITARA, HATTYÛ MAE NI NAIYÔ NI MATIGAI GA NAI KA ISSYO NI KAKUNIN WO ONEGAI ITASIMASU. HAI, OKÔZA NO HÔ GA CCCSAMA NO OKÔZA DE KAI NO TYÛMON DE, MEIGARAKÔDO GA 2××4 NO YUME NO cccc DE GOZAIMASU NE. HAI, KOTIRA WO KABUSÛ GA HITOKABUSASINE GA 340,000EN, KIGEN GA KONNSYÛ KIN'YÔBI MADE, TOKUTEI KÔZA DENO KAITUKE, SIJYÔ GA HERAKURESU NI NARIMASU. SÔSURU TO GAISANKINGAKU 340,000EN. KORE NI PURASU TESURYÔ GA KUWAWARI MASU. NAIYÔ NI OMATIGAI NAI DESYÔKA.
*(NOW, PLEASE CONFIRM TOGETHER IF THERE IS ANYTHING WRONG WITH THE DETAILS BEFORE PLACEMENT OF THE ORDER. THE ACCOUNT IS MR. CCC'S ACCOUNT AND THE ORDER IS A BUY ORDER AND THE BRAND CODE IS DREAM cccc OF 2×X4. THE LIMIT FOR EACH SHARE IS 340,000 YEN, AND THE DUE DATE IS THIS FRIDAY. ALSO, THE PURCHASE IS FROM THE DESIGNATED ACCOUNT AND THE MARKET IS HERCULES. SO, THE ESTIMATE AMOUNT IS 340,000 YEN PLUS COMMISSION. IS THERE ANYTHING WRONG WITH THE DETAILS?)*

(d) DEWA, KAITUKE NO NAIYÔ NI MATIGAI GA NAIKA ISSYO NI KAKUNIN WO ONEGAI ITASIMASU. OKÔZA WA DDDSAMA NO OKÔZA DE KAITUKE NO TYÛMON. MEIGARAKÔDO 3××7 NO dddd. KABUSÛ WA 2,000KABU. SASINE WA 68EN. KIGEN GA KYÔ DAKE. TOKUTEIKÔZA NO KAITUKE, JYASUDAKKUSIJÔ NI NARIMASU. SÔSURU TO GAISAN 136,000EN NI PURASU TESURYÔ 5,250EN KAKARIMASU GA OMATIGAE NAI DESYÔKA.
*(NOW, PLEASE CONFIRM TOGETHER IF THERE IS ANYTHING WRONG WITH THE DETAILS OF PURCHASE. THE ACCOUNT IS MR. DDD'S ACCOUNT AND THE ORDER IS A BUY ORDER. THE BRAND CODE IS dddd OF 3×X7. THE NUMBER OF SHARES IS 2,000. THE LIMIT IS 68 YEN. THE DUE DATE IS TODAY ONLY. THE PURCHASE IS FROM THE DESIGNATED ACCOUNT AND THE MARKET IS JASDAQ MARKET.
SO, THE ESTIMATE IS 136,000 YEN PLUS COMMISSION OF 5,250 YEN. DO YOU FIND ANYTHING WRONG?)*

(e) SOREDEWA TYÛMON NAGASIMASU NODE GOKAKUNIN ONEGAI SIMASU. 3××0 NO eeee, EEESAMA NO GOTYÛMON, HITOKABU 380,000EN NO SASINE. GOTYÛMON NAIYÔ WA KOTIRA DE YOROSÎDESYÔKA.
*(NOW, PLEASE CONFIRM THE ORDER TO BE PLAYED. eeee OF 3×XO, MR. EEE'S ORDER. THE LIMIT OF 380,000 YEN FOR EACH SHARE. WILL THAT BE ALL?)*

FIG. 4

FEATURE QUANTITIES EXTRACTED FROM DEFINITELY MANDATORY
UTTERANCES IN DATA OF STOCK EXCHANGE OVER THE PHONE (A) NOUNS OF WORDS (APPEAR IN TWO OR MORE UTTERANCES)
  FUKUSYÔ *(REPEAT)*
  KAKUNIN *(CONFIRM)*
  GOKAKUNIN *(CONFIRM)*
  GOTYÛMON *(ORDER)*
  MATIGAI *(WRONG)*
  NAIYÔ *(DETAILS)*

(B) COMPOUND(-LIKE) EXPRESSIONS INCLUDING ABOVE WORDS
  TYÛMONNAIYO *(ORDER DETAILS)*
  ISSYO NI KAKUNIN *(CONFIRM TOGETHER)*
  SAIDO KAKUNIN *(RECONFIRMATION)*
  SAISYÛ KAKUNIN *(FINAL CONFIRMATION)*

FIG. 5

RELAXED PATTERN GENERATED BY USE OF FEATURE QUANTITY EXTRACTED FROM DEFINITELY MANDATORY UTTERANCES IN DATA OF STOCK EXCHANGE OVER THE PHONE

KAKUNIN (*CONFIRM*)
KAKUNIN + end = "REQUEST"
KAKUNIN + end = "WILL"
KAKUNIN + start = "TOPIC CHANGE"
GOKAKUNIN (*CONFIRM*)
GOKAKUNIN + end = "REQUEST"
GOKAKUNIN + end = "WILL"
GOKAKUNIN + start = "TOPIC CHANGE"
GOTYÛMON (*ORDER*)
GOTYÛMON + end = "REQUEST"
GOTYÛMON + end = "WILL"
GOTYÛMON + start = "TOPIC CHANGE"
TYÛMONNAIYO (*ORDER DETAILS*)
TYÛMONNAIYO + end = "REQUEST"
TYÛMONNAIYO + end = "WILL"
TYÛMONNAIYO + start = "TOPIC CHANGE"

FIG. 6

RELAXED PATTERN EVALUATION TABLE 23 (NUMBER OF OBJECT DOCUMENTS: 142)

| | NUMBER OF APPEARANCES IN DOCUMENTS CONTAINING DEFINITELY MANDATORY UTTERANCES | | NUMBER OF APPEARANCES IN DOCUMENTS NOT CONTAINING DEFINITELY MANDATORY UTTERANCES | EMPLOYMENT E OR U | |
|---|---|---|---|---|---|
| | MATCHING PORTION (A) | OTHER THAN MATCHING PORTION (B) | (C) | | |
| KAKUNIN AND end= (CONFIRM) | 12 | 27 | 197 | U | } (a) |
| KAKUNIN AND end= "REQUEST" | 12 | 12 | 66 | U | |
| KAKUNIN AND end= "WILL" | 8 | 8 | 64 | U | |
| KAKUNIN AND start= "TOPIC CHANGE" | 12 | 14 | 61 | U | |
| GOKAKUNIN (CONFIRM) | 2 | 0 | 16 | E | |
| GOKAKUNIN AND end= "REQUEST" | 2 | 0 | 10 | E | |
| GOKAKUNIN AND end= "WILL" | 0 | 0 | 0 | E | } (f) |
| GOKAKUNIN AND start= "TOPIC CHANGE" | 2 | 0 | 8 | E | |
| GOTYÛMON (ORDER) | 14 | 8 | 211 | U | } (b) |
| GOTYÛMON AND end= "REQUEST" | 8 | 3 | 33 | E | } (c) |
| GOTYÛMON AND end= "WILL" | 9 | 3 | 17 | E | } (d) |
| GOTYÛMON AND start= "TOPIC CHANGE" | 10 | 5 | 58 | U | } (e) |
| TYÛMONNAIYO (ORDER DETAILS) | 6 | 2 | 18 | E | |
| TYÛMONNAIYO AND end= "REQUEST" | 4 | 2 | 10 | E | |
| TYÛMONNAIYO AND end= "WILL" | 5 | 2 | 11 | E | |
| TYÛMONNAIYO AND start= "TOPIC CHANGE" | 9 | 1 | 10 | E | |

FIG. 7

A. DATA EXAMPLES OF FINANCIAL PRODUCT TRANSACTIONS OVER THE PHONE (a) SOREDEWA, KOKODE KÔNYÛYOTEI NO SYÔHIN NO SETUMEI WO ITASIMASU. HONSYÔHIN AAA WA GAIKOKU NO TEIKIYOKIN WO MOTIIMASU. DESUNODE, KAWASE NO EIKYÔ WO UKEMASU NODE GANNPON NO HOSYÔ HA GOZAIMASEN. GOKAKUNIN YOROSÎ DESYÔKA.
(NOW, I WILL EXPLAIN HERE THE PRODUCT YOU WILL PURCHASE. FOR THIS PRODUCT AAA, FOREIGN TIME DEPOSIT WILL BE USED. SO, SINCE THE PRODUCT IS INFLUENCED BY THE FOREIGN EXCHANGE, THERE IS NO GUARANTEE FOR THE PRINCIPAL. IS THAT OK?)

(b) DEWA, KÔNYUSYOHIN NI TUITE JYÛYÔJIKO WO GOSETUMEI ITASIMASU. OTORIATUKAI NO SYÔHIN BBB WA SIKUMIYOKIN TO NATTE ORIMASU NODE, GENSOKU TOTYÛKAIYAKU NIHA OUJIRAREMASEN. YAMUWOEZU KAIYAKUSURU BAWAI NIHA GANPON WO ÔHABA NI WARIKOMU KANÔSEI GA GOZAIMASU NODE, GORYÔSYÔ KUDASAI. IJYÔ YOROSI DESYÔKA.
(NOW, I WILL EXPLAIN THE IMPORTANT MATTERS ABOUT THE PURCHASE PRODUCT. SINCE THE PRODUCT BBB THAT IS BEING HANDLED IS A SETUP DEPOSIT, IN PRINCIPLE, WE ARE UNABLE TO RESPOND TO THE EARLY CANCELLATION. PLEASE NOTE THAT, IF YOU HAVE TO CANCEL, THERE MAY BE A SIGNIFICANT DROP BELOW THE PRINCIPAL. ARE YOU OK WITH WHAT I'VE JUST SAID?)

(c) SOREDEWA, KONKAI ATUKAIMASU SYÔHIN NI TUITE JYUYÔJIKÔ WO MÔSIAGE ITASIMASU. HONSYÔHIN WA OKYAKUSAMA GA SETTEISARETA HENDÔHABA WO KOETE KAWASE GA HENKÔ SITA BAAI NIWA DORU NITEMANKISIHARAI WO ITASIMASU. SONOTAME, SONOGO, EN NI MODOSU BAWAI NIHA KAASETEISURYÔ GA HASSEI ITASIMASU. KOTIRA DENO KÔNYÛ DE YOROSÎ DE SYÔKA.
(AND NOW, I WILL EXPLAIN THE IMPORTANT MATTERS ABOUT THE PRODUCT THAT IS BEING HANDLED THIS TIME. FOR THIS PRODUCT, IF THE EXCHANGE RATE IS CHANGED TO EXCEED THE BAND YOU HAVE SET, THE DUE PAYMENT WILL BE MADE IN DOLLARS. SO, IF YOU WISH TO EXCHANGE DOLLARS BACK TO YEN AFTER THAT, AN EXCHANGE FEE WILL BE CHARGED. DO YOU WISH TO PURCHASE UNDER THESE CONDITIONS?)

(d) SOREDEWA SYÔHIN NITUITENO TYÛIJIKÔ NI TUITE SETUMEI ITASIMASU. HONSYÔHIN WA TÔSISINTAKUSYÔHIN DE GOZAIMASU NODE RISUKU GA GOZAIMASU. GUTAITEKINIWA GANPON WO WARIKOMU KANÔSEI GA ARU TOIU KOTO DESU. IJYÔ YOROSÎ DESYÔKA.
(NOW, I WILL EXPLAIN THE PRECAUTIONS ABOUT THE PRODUCT. SINCE THIS PRODUCT IS AN INVESTMENT TRUST PRODUCT, THERE ARE RISKS. SPECIFICALLY, THERE IS A POSSIBILITY OF A DROP BELOW THE PRINCIPAL. ARE YOU OK WITH THAT?)

B. FEATURE QUANTITIES EXTRACTED FROM DEFINITELY MANDATORY UTTERANCES IN DATA OF FINANCIAL PRODUCT TRANSACTIONS OVER THE PHONE
FEATURE QUANTITIES BY WORD AND COMPOUND
SYÔHIN (PRODUCT), SYÔSAI (DETAILS), SETUMEI (EXPLAIN),
JYÛYÔJIKÔ (IMPORTANT MATTERS), TYÛIJIKÔ (PRECAUTIONS),
KÔNYÛYOTEI (PURCHASE SCHEDULE)

C. GENARATION AND EVALUATION OF RELAXED PATTERNS

D. DATA OF FINANCIAL PRODUCT EXCHANGE OVER THE PHONE EXTRACTED BY PATTERNS AS RELAXED PATTERN EVALUATION RESULT (a) HAI, KOKODE SYÔHIN NO JYÛYÔJIKÔ NI TUITE YOI DESYÔKA. KIHON TEKINI KOTIRA NO SYÔHIN WA SIKUMIYOKIN TO NARIMASU NODE SYÔHIN NO TOTYÛKAIYAKU WA MITOME RAREMASEN. YOROSI DESYÔKA.
(YES, I WILL EXPLAIN HERE THE IMPORTANT MATTERS ABOUT THE PRODUCT. BASICALLY, THIS PRODUCT IS A SETUP DEPOSIT, WE WILL NOT ACCEPT CANCELLATION OF THE PRODUCT ONCE THE ORDER IS PLACED. ARE YOU OK WITH THAT?)

(b) JYÛYÔJIKO WO KAKUNIN DESU. HONSYÔHIN HA GAIKOKU NO TEIKIYOKIN WO MOTIITE ORIMASU. SONOTAME KAWASE NO EIKYÔNADO NI YORI GANPONWARE WO HIKIOKOSU KANOSEI GA ARIMASU. GOTYÛI KUDASAI.
(PLEASE CONFIRM THE IMPORTANT MATTERS. FOR THIS PRODUCT, FOREIGN TIME DEPOSIT WILL BE USED. SO, PLEASE NOTE THAT THERE IS A RISK OF A DROP BELOW THE PRINCIPAL DUE TO INFLUENCE OF THE FOREIGN EXCHANGE.)

FIG. 9

RELAXED PATTERN EVALUATION TABLE (NUMBER OF OBJECT DOCUMENTS: 100)

| | NUMBER OF APPEARANCES IN DOCUMENTS CONTAINING DEFINITELY MANDATORY UTTERANCES | | NUMBER OF APPEARANCES IN DOCUMENTS NOT CONTAINING DEFINITELY MANDATORY UTTERANCES | EMPLOYMENT E OR U |
|---|---|---|---|---|
| | MATCHING PORTION (A) | OTHER THAN MATCHING PORTION (B) | (C) | |
| SYÔHIN (PRODUCT) | 10 | 20 | 70 | U |
| SYÔHIN AND end= "REQUEST" | 10 | 18 | 68 | U |
| SYÔHIN AND end= "WILL" | 10 | 15 | 50 | U |
| SYÔHIN AND start= "TOPIC CHANGE" | 10 | 15 | 49 | U |
| SYÔSAI (DETAILS) | 20 | 20 | 60 | U |
| SYÔSAI AND end= "REQUEST" | 18 | 3 | 53 | E |
| SYÔSAI AND end= "WILL" | 15 | 3 | 53 | E |
| SYÔSAI AND start= "TOPIC CHANGE" | 15 | 3 | 53 | E |
| SETUMEI (EXPLAIN) | 12 | 25 | 47 | U |
| SETUMEI AND end= "REQUEST" | 12 | 20 | 47 | U |
| SETUMEI AND end= "WILL" | 12 | 10 | 47 | U |
| SETUMEI AND start= "TOPIC CHANGE" | 12 | 3 | 47 | E |
| JÛYÔJIKÔ (IMPORTANT MATTERS) | 8 | 2 | 61 | E |
| JÛYÔJIKÔ AND end= "REQUEST" | 8 | 1 | 61 | E |
| JÛYÔJIKÔ AND end= "WILL" | 8 | 1 | 61 | E |
| JÛYÔJIKÔ AND start= "TOPIC CHANGE" | 8 | 1 | 61 | E |
| TYUIJIKO (PRECAUTIONS) | 21 | 33 | 52 | U |
| TYÛIJIKÔ AND end= "REQUEST" | 21 | 33 | 52 | U |
| TYÛIJIKÔ AND end= "WILL" | 21 | 33 | 25 | U |
| TYÛIJIKÔ AND start= "TOPIC CHANGE" | 21 | 33 | 2 | E |
| KÔNYÛYOTEI (PURCHASE SHEDULE) | 23 | 25 | 76 | U |
| KÔNYÛYOTEI AND end= "REQUEST" | 23 | 21 | 76 | U |
| KÔNYÛYOTEI AND end= "WILL" | 23 | 21 | 76 | U |
| KÔNYÛYOTEI AND start= "TOPIC CHANGE" | 18 | 10 | 76 | U |

FIG. 10

DIALOG PROCESSING SYSTEM, DIALOG PROCESSING METHOD AND COMPUTER PROGRAM

CROSS-REFERENCE TO RELATED APPLICATIONS

This application claims priority under 35 U.S.C. §119 to Japanese Patent Application No. 2007-174862 filed Jul. 3, 2007, the entire text of which is specifically incorporated by reference herein.

BACKGROUND OF THE INVENTION

The present invention relates to a dialog processing system, a dialog processing method and a computer program for extracting mandatory utterances in a specific field from business conversation data, particularly, mandatory utterances for the sake of compliance in sales transactions and the like.

Recently, demands for telesales in a call center have been more and more increased, for example, for stock exchange, bank account management, insurance contract, telephone shopping and the like. Although a transaction through a telephone is simple and convenient for customers, the transaction also has many problems caused by the absence of a medium, such as a written document, which provides authentication information for certifying the transaction. For example, in the case of insurance contract or the like, problems may occur at the time of payment of insurance claim unless mandatory questions are surely checked. In addition, regarding stock exchange, if there is any difference between ordered contents actually listened to by an agent (a staff member responsible for answering incoming calls from customers in a call center) during a telephone conversation, and contents inputted to an order system by the agent, the difference will result in an erroneous order.

To avoid such problems, compliance check has been increasingly required on a transaction or the like through a telephone. Specifically, there has been required checking work for checking whether or not agents make mandatory utterances in a specific field, particularly, mandatory utterances for the sake of compliance in conversations of sales transactions (reconfirmation of ordered items, confirmation of contract, explanations of product risk and the like).

Although, in the checking work, recorded conversations are checked as to whether or not agents make mandatory utterances, it is extremely difficult to monitor all the conversations. This is because, for example, only a few of a hundred agents serve as managers in charge of the checking work. For this reason, it is the current situation that managers manually monitor a small amount of data mainly including data sampled from recorded conversations and conversations of agents on a black list.

To improve the current situation, an attempt was made to check conversations by use of a speech recognition technology as to whether mandatory utterances are made. For the purpose of performing the checking, a speech recognition system must learn utterance portions of mandatory information in conversations with the utterance portions manually labeled beforehand. Moreover, proper transcription data needs be prepared for improvement in a recognition rate. Since contents of utterances regarding mandatory information vary from industry to industry or from company to company, the manual work described above is required every time target data is changed. Moreover, in manual labeling of utterance portions of mandatory information, a range thus labeled may vary due to the manual work.

For automation of the manual labeling, for example, there has been disclosed a method for adding annotations to voice data to be processed through speech recognition, the annotations based on results of conversations by speakers at a call center. By using this method, a specified speaker repeats conversations made by unspecified speakers, and thereby the speech recognition is performed. Then, the results of the speech recognition are utilized for retrieval of sound clips or data mining (for example, Japanese Patent Application Laid-Open Publication No. 2003-316372).

The method disclosed in Japanese Patent Application Laid-open Publication No. 2003-316372 corresponds to labeling of a specific utterance in a conversation. One of similar methods is called dialog act classification, which has heretofore been performed for attaching any one of labels (questions, proposals or requests) to each utterance in a conversation (for example, Stolcke et. al (1998) Dialog Act Modeling for Conversational Speech (AAAI Symposium p. 98-105, 1998)). The heretofore performed dialog act classification is designed for an application such as an interactive voice response system used for ticket reservation and the like.

Moreover, there has been presented a technique of annotating only specific utterances in a conversation, not labeling all the utterances in a conversation (for example, Morgan et. al (2006) Automatically Detecting Action Items in Audio Meeting Recordings (SIGdial Workshop p. 96-103, 2006)). In this technique, discussions in a meeting are monitored to extract utterances regarding action items (decided items in the meeting).

However, even by using the method disclosed in Japanese Patent Application Laid-Open Publication No. 2003-316372, since the specified speaker selectively repeats the conversations of the unspecified speakers, the repeated conversation depends on selection by the specified speaker. Accordingly, it is undeniable that a variation may occur in the result of adding annotations. Moreover, the technique disclosed in Stolcke et. al (1998) Dialog Act Modeling for Conversational Speech (AAAI Symposium p. 98-105, 1998) is for giving appropriate responses by classifying utterances of a user in a specific situation, and needs creating learning data, for setting labels or classifying utterances, from data and response scenarios corresponding to a specific use situation. Furthermore, also for the extraction of the action items in Morgan et. al (2006) Automatically Detecting Action Items in Audio Meeting Recordings (SIGdial Workshop p. 96-103, 2006), an extraction module is constructed by use of feature quantities in previously given correct data. Providing the correct data allows the extraction module to use features obtained from the correct data. Accordingly, the correct data must be newly prepared manually and then be learnt every time data or fields of application are changed.

SUMMARY OF THE INVENTION

It is an object of the present invention to provide a dialog processing system, a dialog processing method and a computer program for extracting mandatory portions in utterances in a specific field from conversation data without requiring any previous knowledge regarding data and fields of application.

According to a first aspect of the present invention, a dialog processing system is provided which outputs data of mandatory utterances in a specific field (defined as mandatory utterances) from utterance patterns which are utterance structures derived from contents of field-independent general conversations and a plurality of utterance data obtained by converting contents of a plurality of conversations in one field into a text format. The dialog processing system includes an utterance data input unit and an utterance pattern input unit. Here, the dialog processing system has the configuration including the two input units but may include only one input unit, which is configured to accept inputs of the utterance data and the utterance patterns. Moreover, a target expression data extraction unit included in the dialog processing system extracts, from the plurality of utterance data inputted through the utterance data input unit, a plurality of target expression data including pattern matching portions which match the utterance patterns inputted through the utterance pattern input unit. The utterance patterns are, for example, patterns of confirmation utterances in a conversation. Next, a feature extraction unit retrieves the pattern matching portions, respectively, from the plurality of target expression data extracted by the target expression data extraction unit so as to extract feature quantities common to a plurality of the pattern matching portions retrieved. The feature quantities are, for example, words that appear a certain number of times or more, words that appear within a certain period of time after start of the utterance, and the like. Moreover, a mandatory data extraction unit extracts mandatory data in the one field included in the plurality of utterance data inputted through the utterance data input unit by use of the feature quantities extracted by the feature extraction unit. The mandatory data in the one field means, particularly, mandatory data for the sake of compliance in sales transactions and the like and data containing portions of mandatory utterances for compliance with laws in a company.

According to a second aspect of the present invention, the conversations are through voice communication, and the utterance data input unit accepts inputs of the plurality of utterance data converted into a text format from the conversations by use of speech recognition. Moreover, a relaxed pattern generation unit generates relaxed patterns by use of the feature quantities extracted by the feature extraction unit. The relaxed patterns are patterns obtained by relaxing the utterance patterns and are generated by combining the feature quantities and parts of the utterance patterns. Moreover, an utterance data evaluation unit evaluates the plurality of utterance data according to the relaxed patterns generated by the relaxed pattern generation unit. The utterance data evaluation unit includes a calculation part and a mandatory pattern generation part. The calculation part calculates the number of appearances of the relaxed patterns by applying the relaxed patterns to the plurality of pattern matching portions, the plurality of target expression data except the plurality of pattern matching portions and the plurality of utterance data except the plurality of target expression data. Moreover, the mandatory pattern generation part generates mandatory patterns from the relaxed patterns according to an expected value of the number of errors calculated by use of the respective numbers of appearances calculated by the calculation part. The mandatory patterns mean patterns for extracting the mandatory data in the one field. Furthermore, the mandatory data extraction unit extracts the mandatory data in the one field from the plurality of utterance data according to the evaluation results obtained by the utterance data evaluation unit, in other words, the mandatory patterns generated by the mandatory pattern generation part.

According to a third aspect of the present invention, the feature extraction unit included in the dialog processing system extracts the feature quantities according to at least any one of a certain number or more of words which appear and are included in the plurality of pattern matching portions and expressions including the words. Alternatively, the feature extraction unit may extract the feature quantities according to a distribution of conversation time in which the plurality of pattern matching portions are generated. Moreover, the relaxed pattern generation unit included in the dialog processing system generates the relaxed patterns according to the feature quantities by use of component words that constitute the utterance patterns. The component word is a characteristic word in a pattern included in the utterance pattern. In the case of a confirmation utterance, for example, an expression for "topic change" such as "Dewa (Now)" or an expression representing "a will" such as " . . . itasimasu (I will . . . )."

According to a fourth aspect of the present invention, the feature extraction unit included in the dialog processing system extracts feature quantities common to the mandatory data by using the mandatory data in the one field extracted by the mandatory data extraction unit as the plurality of pattern matching portions.

According to a fifth aspect of the present invention, the mandatory data in the one field extracted by the mandatory data extraction unit is data that can be verified by an F measure calculated by use of precision (P) of the mandatory data in the one field and recall (R) of the mandatory data in the one field.

Moreover, as another embodiment of the present invention, a computer program executed in a method or a computer can be provided.

The following are advantages of the present invention. First, utterance patterns which are utterance structures derived from contents of field-independent general conversations and a plurality of utterance data obtained by converting contents of a plurality of conversations in one field into a text format are inputted to extract data of mandatory utterances in the one field, particularly, mandatory utterances for the sake of compliance in sales transactions and the like. Thus, the mandatory utterance data is extracted only by preparing the two kinds of input data, the utterance patterns and the utterance data. Consequently, many portions of the mandatory utterances in the utterance data can be automatically extracted without any previous knowledge regarding data and fields of application. This can be realized by finding out confirmation utterance patterns which enable accurate extraction of mandatory utterances in a free conversation not defined by patterns, for example, in a specific field.

Secondly, relaxed patterns are generated by use of the corresponding portions (pattern matching portions) of the target expression data extracted by the utterance patterns when mandatory data in a specific field is outputted. Among the relaxed patterns, for example, those exceeding a certain value (not less than a threshold) are used as the mandatory patterns. Thus, mandatory patterns more compatible with diversity of utterance expressions can be accurately generated by use of the utterance patterns and the target expression data. Therefore, more accurate mandatory data can be extracted by use of the mandatory patterns.

Third, mandatory data in a specific field can be evaluated by the F measure calculated by use of the precision and the recall. Thus, a user can verify accuracy of the mandatory data by use of the F measure that is an index of accuracy of the mandatory data in the specific field. Moreover, mandatory utterances in a specific field having less variation can be obtained within a shorter period of time by manual processing according to the mandatory data in the specific field obtained by use of the method of the present invention.

BRIEF DESCRIPTION OF THE DRAWINGS

For a more complete understanding of the present invention and the advantage thereof, reference is now made to the following description taken in conjunction with the accompanying drawings.

FIGS. 3(a) and 3(b) are views showing examples of utterance patterns regarding confirmation utterances.

FIGS. 4(a) to 4(e) are views showing examples of utterances given by an agent, which match the utterance patterns as a part of target expression data extracted from the utterance data by use of the utterance patterns shown in FIGS. 3(a) and 3(b).

FIGS. 5(a) and 5(b) are views showing feature quantities extracted from definitely mandatory utterances (pattern matching portions) shown in FIGS. 4(a) to 4(e).

FIG. 6 is a view showing relaxed patterns generated by use of the feature quantities shown in FIG. 5.

FIG. 7 is a view showing a relaxed pattern evaluation table 23 showing the number of appearances of patterns generated in FIG. 6.

FIG. 9 is a view showing an example of the case where utterance patterns are used for data of financial product transactions over the phone.

FIG. 10 is a view showing a relaxed pattern evaluation table generated from the example shown in FIG. 9.

DETAILED DESCRIPTION OF THE PREFERRED EMBODIMENTS

Figure 1:
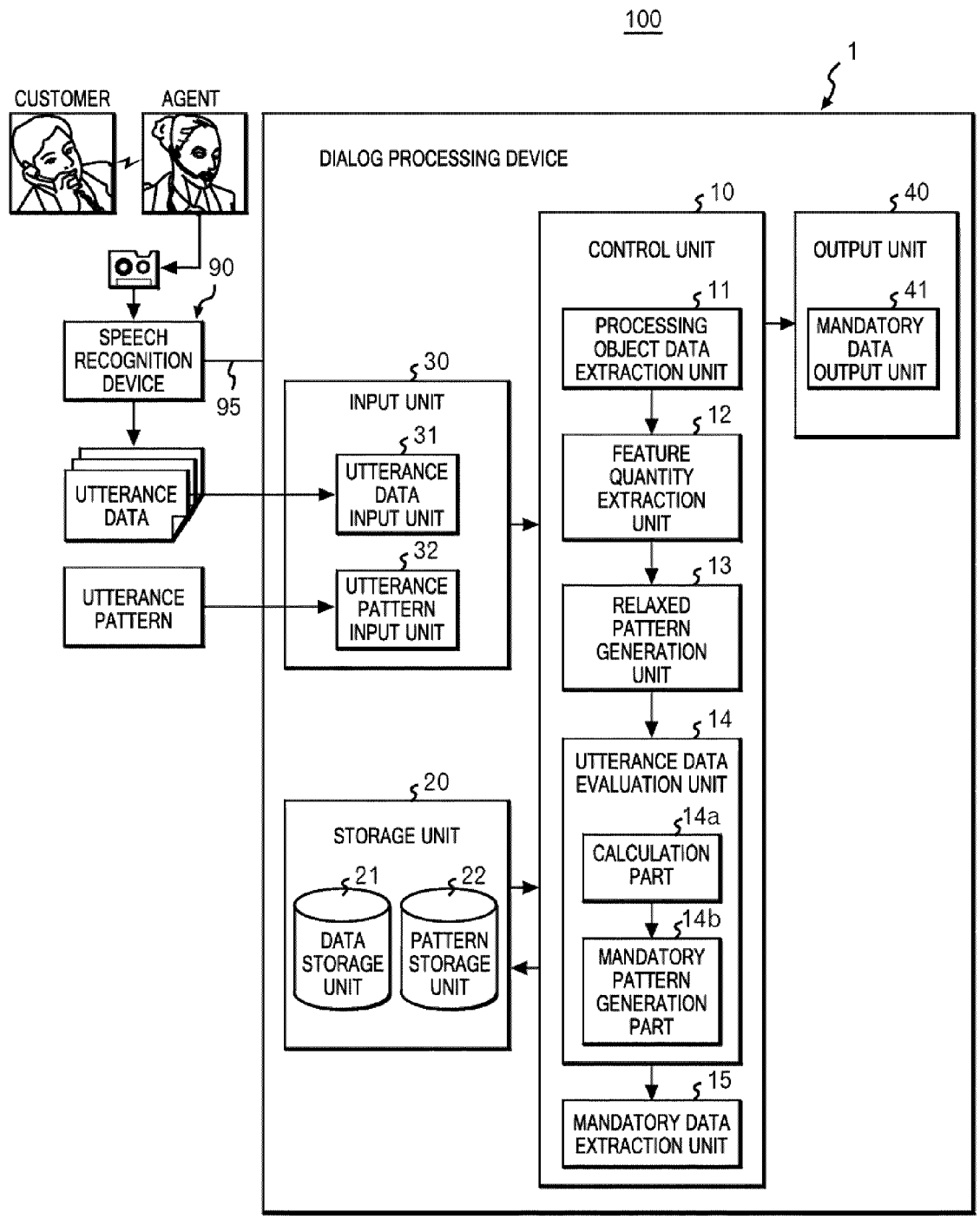
FIG. 1 is a view showing an example of a configuration of a dialog processing system according to an embodiment of the present invention.

With reference to the drawings, an embodiment of the present invention will be described below. FIG. 1 is a view showing an example of a configuration of a dialog processing system 100 according to the embodiment of the present invention. The dialog processing system 100 includes a dialog processing system 1 and a speech recognition device 90. The speech recognition device 90 generates utterance data by converting one phone call between an agent and a customer into a text format as one conversation unit.

The dialog processing system 1 mainly includes: a control unit 10 for controlling the entire dialog processing system 1; a storage unit 20 for storing data and tables used in the dialog processing system 1; an input unit 30 for inputting data; and an output unit 40 for outputting data. Data to be inputted to the input unit 30 includes, for example, data (utterance data) generated by the speech recognition device 90. Moreover, data to be outputted to the output unit 40 includes, for example, mandatory data (mandatory data in one field) for the sake of compliance, which is referred to by a manager who manages agents. The speech recognition device 90 may be connected to the dialog processing system 1 through a communication network 95 or may transmit and receive data to and from the dialog processing system 1 through a medium and the like.

The control unit 10 mainly includes a target expression data extraction unit 11, a feature extraction unit 12, a relaxed pattern generation unit 13, an utterance data evaluation unit 14 and a mandatory data extraction unit 15. Moreover, the utterance data evaluation unit 14 has a calculation part 14a and a mandatory pattern generation part 14b. The storage unit 20 has a data storage unit 21 and a pattern storage unit 22. The input unit 30 has an utterance data input unit 31 and an utterance pattern input unit 32. The output unit has a mandatory data output unit 41.

The utterance data input unit 31 in the input unit inputs utterance data that is conversation data converted into a text format. Moreover, the utterance pattern input unit inputs utterance patterns that is a pattern generated according to utterance structures derived by analyzing conversations of agents. The utterance patterns are patterns obtained according to the utterance structures of field-independent conversations, and are previously found rules. Note that, here, the input unit 30 has the configuration including the utterance data input unit 31 and the utterance pattern input unit 32. However, the input unit 30 may accept inputs of both of the utterance data and the utterance patterns.

The target expression data extraction unit 11 in the control unit 10 extracts target expression data to be processed from the utterance data. The data to be processed is utterance data that match the utterance patterns. The feature extraction unit 12 extracts feature quantities common to the target expression data from the target expression data. The relaxed pattern generation unit 13 generates relaxed patterns that are patterns obtained by relaxing the utterance patterns by use of the feature quantities. The relaxed patterns are patterns generated by combining the feature quantities and parts of the utterance patterns. The relaxed patterns thus generated make it possible to extract data to be processed in a wider range than the target expression data, from the utterance data. Specifically, it is possible to extract, from the utterance data, necessary data which is left out and cannot be extracted by use of the utterance patterns.

The utterance data evaluation unit 14 evaluates whether or not the relaxed patterns are appropriate. To be more specific, the calculation part 14a included in the utterance data evaluation unit 14 calculates, by use of the relaxed patterns, the number of appearances, which is the number of relaxed patterns that appear in the utterance data. Moreover, the mandatory pattern generation part 14b included in the utterance data evaluation unit 14 generates mandatory patterns from the relaxed patterns according to the calculation result. The mandatory patterns are patterns for extracting data of mandatory expressions in a specific field, particularly, mandatory data for the sake of compliance in sales transactions and the like. The mandatory data extraction unit 15 extracts the mandatory data for the sake of compliance from the utterance data according to the mandatory patterns.

The data storage unit 21 in the storage unit 20 stores data such as the utterance data inputted through the utterance data input unit 31, the target expression data generated by the processing described above and the mandatory data for the sake of compliance. Moreover, the pattern storage unit 22 stores pattern data such as the utterance patterns inputted through the utterance pattern input unit 32, the relaxed patterns generated by the processing described above and the mandatory patterns.

The mandatory data output unit 41 in the output unit 40 outputs the mandatory data for the sake of compliance, which are extracted by the mandatory data extraction unit 15 described above.

Figure 2:
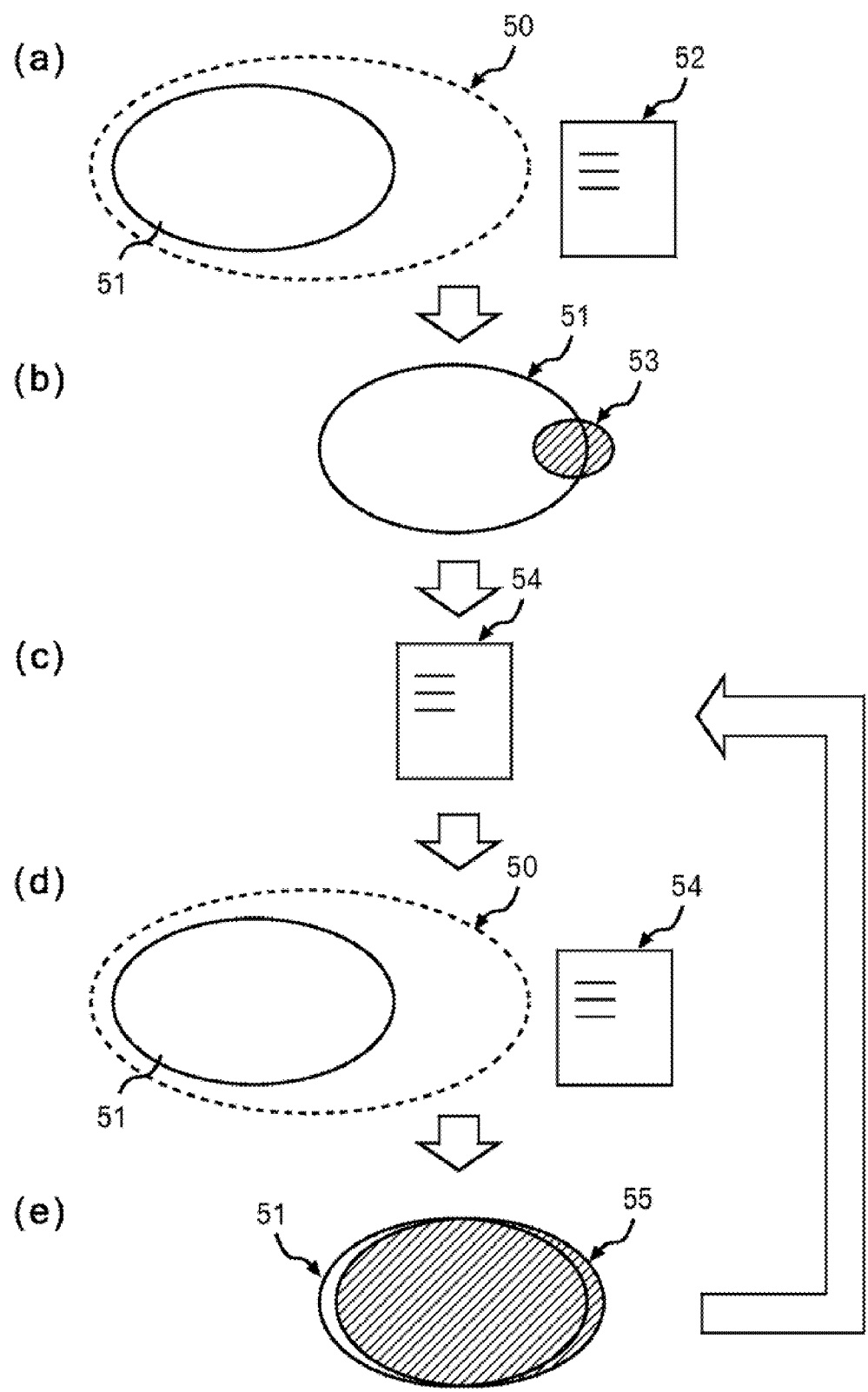
FIGS. 2(a) to 2(e) are views showing an example of all utterances in a conversation and mandatory utterances to be required for the sake of compliance.

FIGS. 2(a) to 2(e) are views showing an example of all utterances in a conversation and mandatory utterances to be required for the sake of compliance. FIG. 2(a) shows all-utterances 50 in a conversation, mandatory utterances 51 in the conversation and a mandatory utterance extraction logic 52 that is utterance patterns. The all-utterances 50 in the conversation are utterance data obtained by converting a conversation in a certain field into a text format. Here, each of a conversation regarding insurance contract and a conversation regarding telephone shopping, for example, is a conversation in one field. The mandatory utterances 51 in the conversation are utterances regarding confirmation among the all-utterances 50 in the conversation. The present invention is intended to automatically obtain data more approximate to the mandatory utterances 51 in a conversation by extracting as many mandatory utterances 51 in the conversation as possible and by extracting as few utterances other than the mandatory utterances 51 in the conversation as possible.

On the other hand, the mandatory utterance extraction logic 52 is a logic using utterance structures independent of fields or data, and is patterns for extracting the mandatory utterances 51 in the conversation, which is obtained as a result of analyzing utterances in conversations on every field including the all-utterance 50 in the conversation. To be more specific, the mandatory utterance extraction logic 52 is, for example, one shown in FIG. 3 to be described later.

FIG. 2(b) shows a result of applying the mandatory utterance extraction logic 52 to the all-utterance 50 in a conversation. Definitely mandatory utterances 53 that are target expression data extracted as a result of the application are shown in comparison to the mandatory utterances 51 in the conversation. The definitely mandatory utterances 53 are set to have a high precision by use of the mandatory utterance extraction logic 52. At the point of FIG. 2(b), the precision is high since most of the definitely mandatory utterances 53 extracted are included in the mandatory utterances 51 in the conversation. However, a recall is low since most of the mandatory utterances 51 in the conversation are remaining.

FIG. 2(c) shows mandatory utterance feature quantity extraction logic 54 that is mandatory patterns. The mandatory utterance feature quantity extraction logic 54 is an extraction logic derived from a distribution of expressions in the definitely mandatory utterances 53 and the all-utterances 50 in the conversation, and is one obtained by adding features of the all-utterances 50 in the conversation to the mandatory utterance extraction logic 52. FIG. 2(d) shows the all-utterances 50 in the conversation, the mandatory utterances 51 in the conversation and the mandatory utterance feature quantity extraction logic 54.

FIG. 2(e) shows a result of applying the mandatory utterance feature quantity extraction logic 54 to the all-utterances 50 in the conversation. Mandatory utterances 55 that are mandatory data for the sake of compliance and which are extracted as a result of the application, are shown in comparison to the mandatory utterances 51 in the conversation. The mandatory utterance feature quantity extraction logic 54 can increase the recall while maintaining the high precision compared with the mandatory utterance extraction logic 52 since features of the all-utterances 50 in the conversation are added to the mandatory utterance extraction logic 52. Thereafter, an extraction logic that increases the recall while maintaining a higher precision can be generated by returning to FIG. 2(c) and repeating the processing from FIG. 2(c) to FIG. 2(e). Moreover, by use of the generated extraction logic, a large amount of mandatory data for the sake of compliance can be extracted while reducing mismatched data.

FIGS. 3(a) and 3(b) show examples of utterance patterns regarding a confirmation utterance. FIG. 3(a) shows an utterance pattern of a confirmation utterance made by an agent. In this pattern, the conversation ends after: an arbitrary number of sentences; a sentence starting with an expression for "topic change" and ending with an expression representing "will" or "request"; two or more sentences; a sentence ending with an expression for "confirmation"; and then an arbitrary number of sentences (not always necessary). Here, the expression for "topic change" is a phrase such as "Soredewa . . . (And now . . . )", "Dewa . . . (Now . . . )", "Mazu . . . (First . . . )" and "Kokode . . . (Here . . . )", and is determined by checking whether or not the beginning of a sentence matches the expression for "topic change" (start="topic change"). Similarly, the expression representing "will" is a phrase such as "I will . . . ", and is determined by checking whether or not the end of a sentence matches the expression representing "will" (end="will"). The expression for "request" is a phrase such as " . . . onegaiitasimasu ( . . . please)", and the expression for "confirmation" is a phrase such as " . . . yorosîdeshôka (Would . . . be possible?)".

FIG. 3(b) shows a confirmation utterance pattern of a conversation different from that shown in FIG. 3(a). FIG. 3(b) shows the pattern of the utterance given by an agent, in which a sentence that starts with an expression for "topic change" and ends with an expression representing "will" or "request" comes after an arbitrary number of sentences and, thereafter, the conversation ends without an expression representing "confirmation" after two sentences or more.

The utterance patterns regarding the confirmation utterances generated as described above are common patterns in all kinds of fields (industries) such as stock exchange, bank account management, insurance contract and telephone shopping, and are not dependent on the fields. Moreover, as shown in FIGS. 3(a) and 3(b), as one kind of utterance pattern not only one pattern but a plurality of utterance patterns exist. This is because, when an agent has a conversation with a customer for confirmation, contents of the conversation differ according to a level of understanding of the customer, a response of the customer and the like.

FIGS. 4(a) to 4(e) are views showing examples of utterances given by an agent, which match the utterance patterns as a part of the target expression data extracted from the utterance data by use of the utterance patterns shown in FIGS. 3(a) and 3(b) described above. With reference to FIGS. 4 to 8, description will be given below of examples of utterances obtained by applying the utterance patterns to data of stock exchange over the phone. FIGS. 4(a) to 4(e) show examples of extracting, as mandatory utterances, order confirmation data in the stock exchange from the data of stock exchange over the phone. In FIG. 4(a) shows a sentence that starts with an expression for "topic change" of "Soredewa (And now)", and ends with an expression representing "will" of " . . . itasimasu (I will)". Moreover, after a sentence therefrom, there is a sentence that ends with an expression for "confirmation" of " . . . yorôsîdesyôka (Are we right)?". This is the data of an utterance exactly conforming to the utterance pattern shown in FIG. 3(a), and is a copybook example of a definitely mandatory utterance.

In FIGS. 4(a) to 4(e), utterances given by the agent before and after the utterances are omitted and only the matching portions in the utterances are extracted. Note that utterance data extracted by use of the utterance patterns and including the utterances omitted in FIGS. 4(a) to 4(e) are called target expression data. Moreover, portions that match with the utterance patterns as shown in FIGS. 4(a) to 4(e) are called pattern matching portions. Similarly, the data shown in FIGS. 4(b) to 4(e) are also the data exactly expressing the utterance pattern shown in FIG. 3(a).

FIGS. 5(a) and 5(b) are views showing feature quantities extracted from the definitely mandatory utterances (pattern matching portions) shown in FIGS. 4(a) to 4(e). In this example, as the feature quantities, words appearing a certain number of times or more are extracted. First, in FIG. 5(a), words that appear a certain number of times or more are extracted on a word unit basis. For example, the word of "kurikaesi (repeat)" is used in the utterance patterns shown in FIGS. 4(a) and 4(b) among those shown in FIGS. 4(a) to 4(e). Moreover, the word of "kakunin (confirm)" is used in the utterance patterns shown in FIGS. 4(c) and 4(d) among those shown in FIGS. 4(a) to 4(e). Similarly, in FIG. 5(b), compound expressions containing the words shown in FIG. 5(a) are extracted. For example, the compound of "tyûmonnaiyô (order details)" is used in the utterance patterns shown in FIGS. 4(a) and 4(e) among those shown in FIGS. 4(a) to 4(e). As described above, the words and compounds that appear a certain number of times or more and commonly appear in a certain number or more of documents are extracted.

FIG. 6 is a view showing relaxed patterns generated by use of the feature quantities shown in FIGS. 5(a) and 5(b). In this example of FIG. 6, each of the relaxed patterns obtained by relaxing the utterance patterns shown in FIGS. 3(a) and 3(b) described above is generated by combining the feature quantity extracted as shown in FIGS. 5(a) and 5(b) described above with the portion of the utterance patterns shown in FIGS. 3(a) and 3(b) described above. In FIGS. 3(a) and 3(b) described above, a confirmation utterance in the conversation is a sentence that starts with the expression representing "topic change" and ends with the expression representing "will" or "request". Thus, the expressions for "topic change", "will" and "request" are separated from each other and each of the separated expressions and a word extracted as the feature quantity are combined with each other. As described above, by combining the feature quantities with the utterance patterns after being relaxed, many patterns can be generated. For example, a pattern including a word of "kakunin (confirm)" is shown in the top row of FIG. 6, and a pattern that includes a word of "kakunin (confirm)" and ends with a sentence having an expression representing "request" is shown in the second row.

Note that, in FIG. 6, a relaxed pattern is made of a combination of a feature quantity and a portion of the utterance patterns or made only of a feature quantity. However, a relaxed pattern may be made only of some portions of the utterance patterns. The utterance patterns are generally created only to match well-built texts. However, in actual conversations, an agent often engages with casual conversations according to a response of the customer. Accordingly, the relaxed patterns are generated so as to process utterance data containing even only some portions of the utterance patterns.

FIG. 7 is a view showing a relaxed pattern evaluation table 23 showing the number of appearances of the relaxed patterns generated as shown in FIG. 6. The relaxed pattern evaluation table 23 is stored in the storage unit 20. In the table 23, listed are values of the numbers of appearances (A), (B) and (C) of each of the relaxed patterns generated as shown in FIG. 6 described above, and a judgment result indicating whether or not to employ the pattern. Here, the number of appearances (A) indicates the number of times that a certain pattern appears in the utterance patterns (pattern matching portions) in the target expression data that are documents containing definitely mandatory utterances. The number of appearances (B) indicates the number of times that the certain pattern appears in portions other than the utterance patterns (pattern matching portions) in the target expression data that are documents containing definitely mandatory utterances. Then, the number of appearances (C) indicates the number of times that the certain pattern appears of in documents not containing the definitely mandatory utterances. In the example of FIG. 7, the judgment result as to whether or not to employ a pattern is indicated by E or U. More specifically, a pattern is employed as a mandatory pattern when the expected value of the number of errors obtained by the following formula is equal to or less than one tenth of the total number of object documents, that is, 14.2 that is one tenth of 142. Meanwhile, a pattern is not employed when the expected value of the number of errors exceeds one tenth.

$$\frac{B}{A+B} \times C \qquad (1)$$

FIG. 7(a) shows the numbers of appearances of a word of "kakunin (confirm)" and has the expected value of the number of errors of 136.3 when the values of (A) to (C) are put into the formula (1) described above. Since the value of 136.3 exceeds 14.2 that is one tenth of the total number of object documents, the pattern is not employed. Similarly, since the expected value of the number of errors for a pattern including a word of "gotyûmon (order)" shown in FIG. 7(b) is 76.7, the pattern is not employed. Meanwhile, the expected value of the number of errors for a pattern that includes a word of "gotyûmon (order)" and ends with a sentence having the expression representing "request" shown in FIG. 7(c) is 9.0, which is smaller than 14.2. Thus, the above pattern is employed as a mandatory pattern. By similarly performing calculations, a pattern that includes a word of "gotyûmon (order)" and ends with a sentence having the expression representing "will" shown in FIG. 7(d) is employed, and a pattern that includes a word of "gotyûmon (order)" and starts with a sentence having the expression for "topic change" shown in FIG. 7(e) is not employed. Note that, although the numbers of appearances (B) and (C) are both 0 in FIG. 7(f), the pattern is employed as a mandatory pattern since including the pattern is considered to have no practical effect. By employing those that satisfy certain criteria as described above, the mandatory patterns which are conditions more relaxed than the original utterance patterns can be generated.

Figure 8:
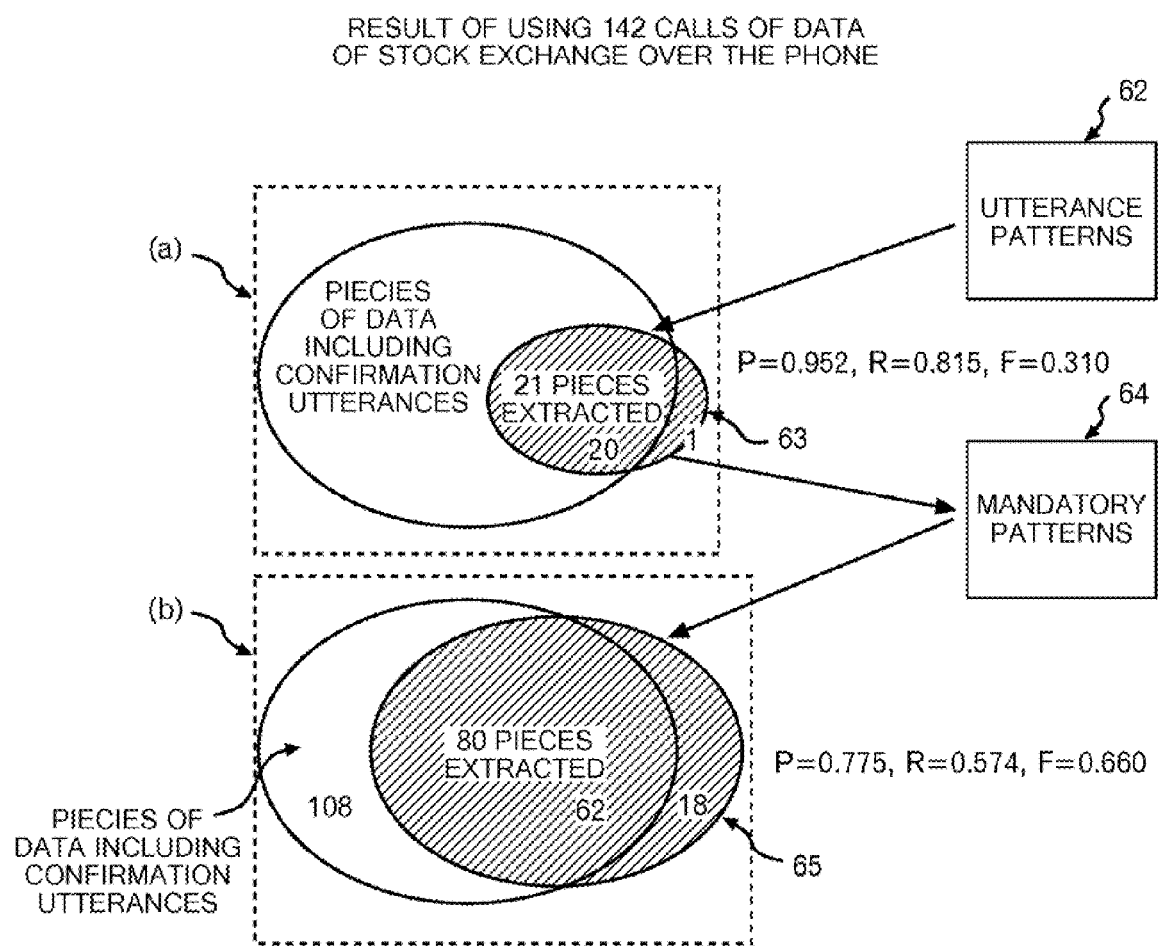
FIG. 8 is a view showing extraction by use of utterance patterns and extraction by use of mandatory patterns in comparison to each other.

FIG. 8 is a view showing extraction by use of utterance patterns and extraction by use of mandatory patterns in comparison to each other. FIG. 8(a) schematically shows a result of extraction by use of utterance patterns 62. While there are 108 pieces of data including confirmation utterances, 21 pieces of target expression data 63 are extracted as a whole. Among the target expression data 63, 20 pieces are correctly extracted and 1 piece is erroneously extracted. In this case, the precision P is calculated by 20/21. Moreover, the recall R is calculated by 20/108. An F measure calculated by the following formula using the precision P and the recall R is 0.310.

$$2 \div \left(\frac{1}{P} + \frac{1}{R}\right) \qquad (2)$$

Since the recall R is generally lowered as the precision P is increased, the F measure is an index for accuracy evaluation that can be performed in consideration of both of the precision P and the recall R. The maximum value of the F measure is 1, and the F measure closer to 1 represents correct extraction.

Similarly, FIG. 8(b) schematically shows a result of extraction by use of mandatory patterns 64. While there are 108 pieces of data including confirmation utterances, 80 pieces of mandatory data 65 for the sake of compliance are extracted as a whole since the mandatory patterns 64 obtained by relaxing the utterance patterns 62 and further carefully examining the relaxed patterns are used. From the mandatory data 65 for the sake of compliance, 62 pieces are correctly extracted and 18 pieces are erroneously extracted. In this case, an F measure is calculated to be 0.660 when the values are put into the formula (2) described above. Comparing FIGS. 8(*a*) and 8(*b*), the F measure is improved and the recall R is made significantly improved without largely lowering the precision P.

Moreover, the recall R can be increased by further extending the rules from the mandatory data 65 for the sake of compliance as the obtained result. The rules can be extended by use of a manual method or by generating mandatory patterns 64 by use of the mandatory data 65 for the sake of compliance again.

FIGS. 9 and 10 show examples of the case where utterance patterns are used for data of financial product transactions over the phone. FIG. 9A shows examples of utterances of an agent that match the utterance patterns among the target expression data extracted from the utterance data by use of the utterance patterns shown in FIGS. 3(*a*) and 3(*b*) described above. FIG. 9A(a) includes a sentence that starts with the expression for "topic change" of "Soredewa (And now)" and ends with an expression representing "will" of " . . . itasimasu (I will). Moreover, sentences follow after the above sentence and a sentence that ends with the expression for "confirmation" of " . . . yorosîdesyôka (Are you OK . . . ?)" comes subsequent thereto. As described above, the data shown in FIG. 9A is the data exactly expressing the utterance patterns shown in FIG. 3.

FIG. 9B shows feature quantities extracted from the data shown in FIG. 9A. In this example, as the feature quantities, respective words of "syôhin (product)", "syôsai (details)", "setumei (explain)", "jyûyôzikô (important matters)", "tyûizikô (precautions)" and "kônyûyotei (purchase schedule)" or compounds thereof are extracted as those appears a certain number of times or more.

In FIG. 9C, relaxed patterns are generated by use of the feature quantities shown in FIG. 9B and evaluated. As a concrete example, a relaxed pattern evaluation table shown in FIG. 10 is generated to evaluate the relaxed patterns by making judgments of employment. The relaxed pattern evaluation table is stored in the storage unit 20. The relaxed patterns in the relaxed pattern evaluation table are generated by combining the feature quantities extracted as shown in FIG. 9B described above with the portions of the utterance patterns shown in FIG. 3 described above. For each of the relaxed patterns, the number of appearances is obtained in each of targets shown in FIG. 10, and it is judged whether or not the pattern can be employed. In the example of FIG. 10, a pattern is employed as a mandatory pattern when the expected value of the number of errors calculated is not more than 15% of the total number of object documents, and those other than the above are not employed.

FIG. 9D shows data of financial product transactions over the phone, which is extracted from the utterance data by use of the patterns obtained as the result of evaluation of the relaxed patterns. As shown in FIGS. 9D(a) and 9D(b), the data of transactions over the phone including the compound of "jyûyôzikô (important matters)" are extracted even though the data do not match the utterance patterns.

In the above examples, the data of stock exchange over the phone are described as the input data in FIGS. 4 to 8 and the data of financial product exchange over the phone are described as the input data in FIGS. 9 and 10. As described above, in the present invention, even if the fields or data differ, the mandatory utterances can be applied to cases required in a specific field, such as "tyûmonsaikakunin (order reconfirmation)", "keiyakunaiyô no kakunin (confirmation of contract details)" and "syôhinrisuku no setumei (explanation of product risk)", particularly, most cases assumed for the sake of compliance in sales transactions and the like.

Figure 11:
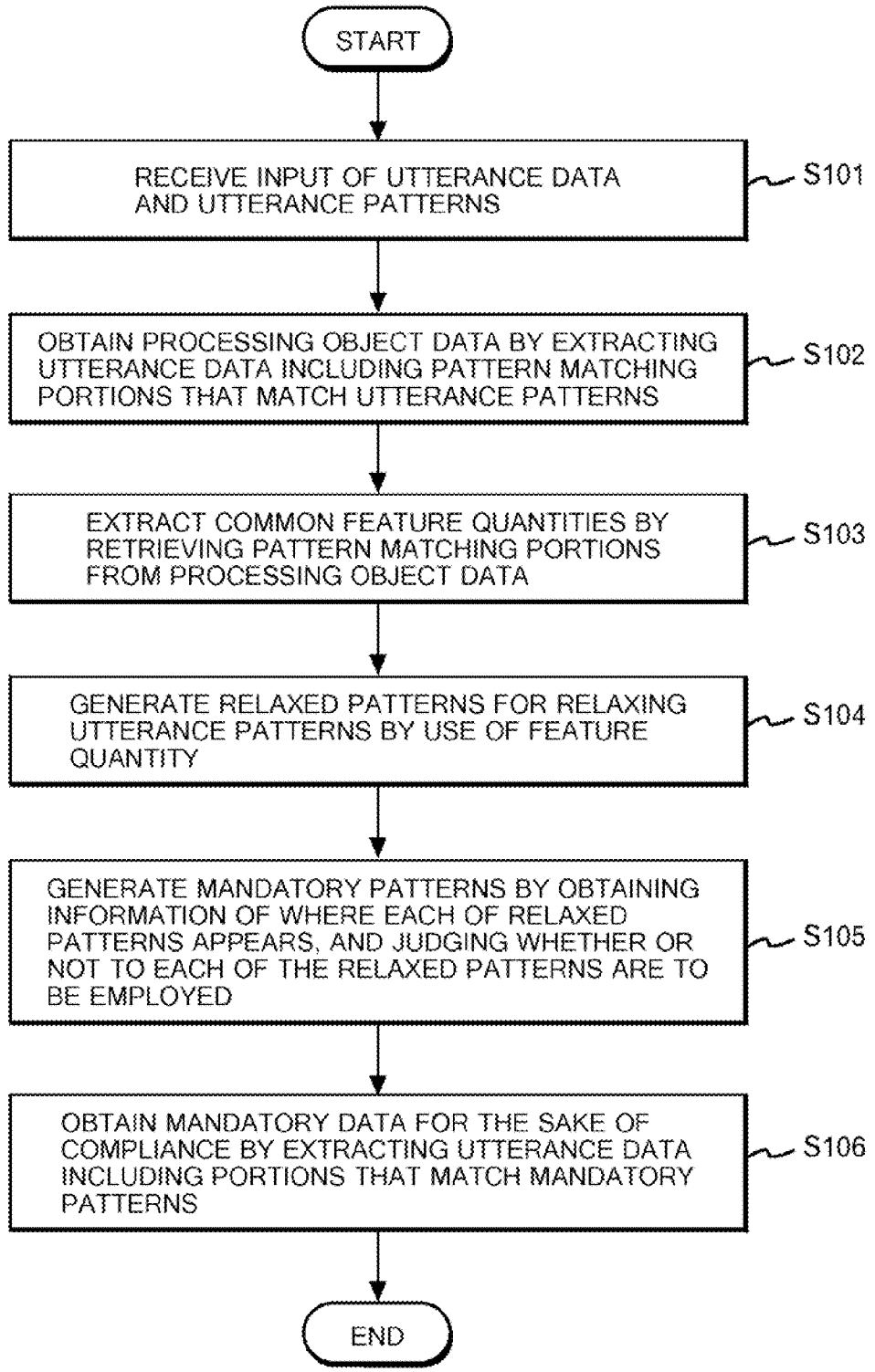
FIG. 11 shows a flowchart of the present invention.

FIG. 11 shows a flowchart of the present invention. First, in Step S101, the utterance data input unit 31 receives an input of utterance data and the utterance pattern input unit 32 receives an input of utterance patterns. The control unit 10 stores the received utterance data and utterance patterns in the data storage unit 21 and the pattern storage unit 22, respectively.

Next, in Step S102, the target expression data extraction unit 11 extracts utterance data containing pattern matching portions which match the utterance patterns and sets the extracted utterance data to be target expression data. The control unit 10 stores the target expression data in the data storage unit 21.

Thereafter, in Step S103, the feature extraction unit 12 retrieves the pattern matching portions from the target expression data so as to extract a feature quantities common to the pattern matching portions. The control unit 10 stores the pattern matching portions and the feature quantities in the storage unit 20.

Subsequently, in Step S104, the relaxed pattern generation unit 13 generates relaxed patterns obtained by relaxing the utterance patterns, by use of the feature quantities. The control unit 10 generates a relaxed pattern evaluation table 23 including the relaxed patterns in the storage unit 20.

Thereafter, in Step S105, the utterance data evaluation unit 14 obtains information of where each of the relaxed patterns appears, judges whether or not each of the relaxed patterns are to be employed, and generates mandatory patterns from the relaxed patterns. To be more specific, among the target expression data retrieved in Step S103, the calculation part 14*a* obtains the number of appearances of each of the relaxed patterns in each of the pattern matching portions which match the utterance patterns, the target expression data except the pattern matching portions and the utterance data except the target expression data, and stores the obtained number of appearances in the relaxed pattern evaluation table 23. Subsequently, the mandatory pattern generation part 14*b* generates mandatory patterns which are required to satisfy predetermined standards. The control unit 10 stores the generated mandatory patterns in the pattern storage unit 22. Note that, judgments are made by defining, as the predetermined standard, whether or not an expected value of the number of errors exceeds a threshold of a predetermined proportion (one-tenth, 15%) to the number of object documents in FIGS. 7 and 10 described above. However, it is also possible to employ a predetermined number of patterns sequentially from a pattern having a small expected value of the number of errors and to stop employment when the cumulative number of errors exceeds the threshold.

In Step S106, the mandatory data extraction unit 15 extracts utterance data including portions which match the mandatory patterns, and sets the extracted utterance data to be mandatory data for the sake of compliance. The control unit 10 stores the mandatory data for the sake of compliance in the data storage unit 21 and outputs the mandatory data for the sake of compliance through the mandatory data output unit 41. Note that, besides the mandatory data for the sake of compliance, the mandatory patterns stored in the pattern storage unit 22 may be outputted. Thereafter, the control unit 10 terminates this processing.

The present invention makes it possible to automatically extract, from the utterance data, many portions of mandatory utterances, which are required in a specific field, without using any previous knowledge specific to an industry or a company. Moreover, also in the case where correct data are required in another use application, accurate data having less variation can be produced within a shorter period of time by manually producing more accurate data according to a result obtained by use of the method of the present invention.

In the present invention, is involved no manual process between input and output of the utterance patterns and the utterance data. Thus, the extracted result is based on unified standards. This result can also be used as a guide for manual labeling. Accordingly, in the case of further performing the manual labeling, occurrence of wobbling can be reduced.

Figure 12:
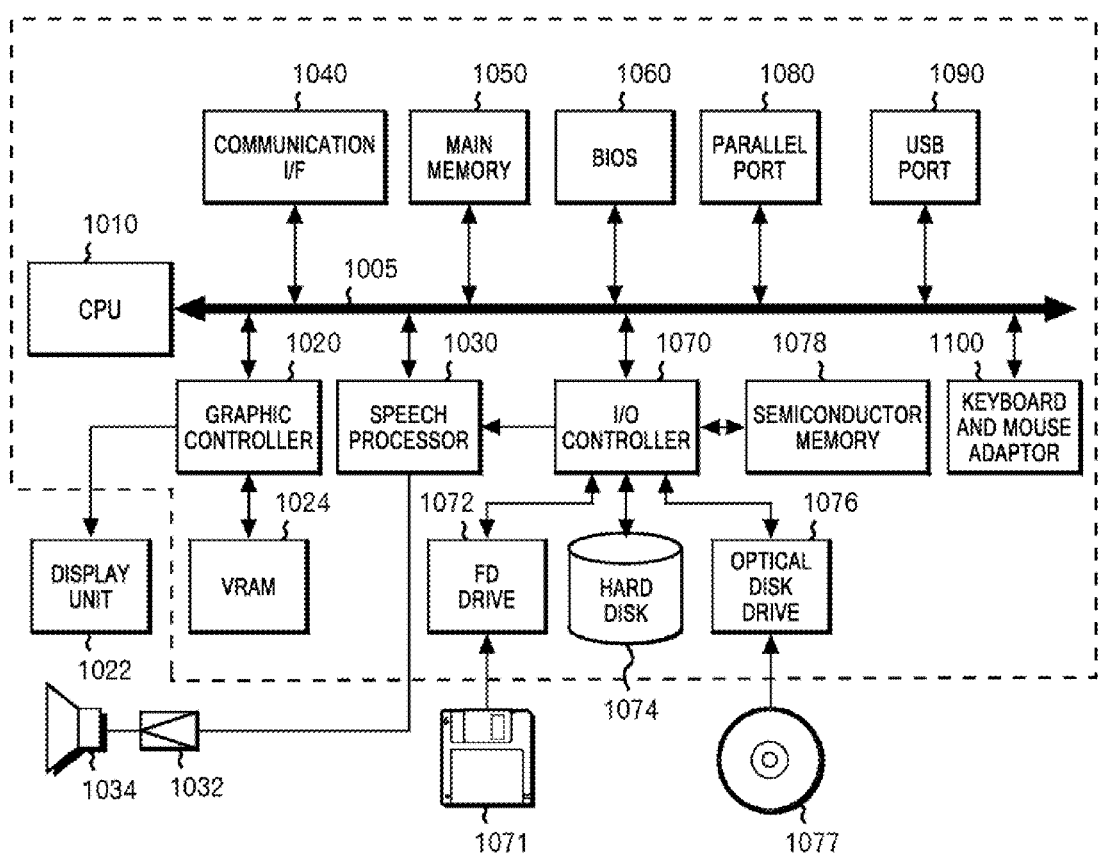
FIG. 12 is a view showing a hardware configuration of a dialog processing system according to the embodiment of the present invention.

FIG. 12 is a view showing a hardware configuration of the dialog processing system 1 according to the embodiment of the present invention. Although a general configuration as an information processor typified by a computer will be described below, it is a matter of course that, in the case of a specialized machine or a built-in device, a required minimum configuration can be selected according to an environment thereof.

The dialog processing system 1 includes a Central Processing Unit (CPU) 1010, a bus line 1005, a communication I/F 1040, a main memory 1050, a Basic Input Output System (BIOS) 1060, a parallel port 1080, an USB port 1090, a graphic controller 1020, a VRAM 1024, a speech processor 1030, an I/O controller 1070 and input means such as keyboard and mouse adaptor 1100. Moreover, storage means such as a flexible disk (FD) drive 1072, a hard disk 1074, an optical disk drive 1076 and a semiconductor memory 1078 can be connected to the I/O controller 1070. A display unit 1022 is connected to the graphic controller 1020. Moreover, as options, an amplifier circuit 1032 and a speaker 1034 are connected to the speech processor 1030.

The BIOS 1060 stores a boot program executed by the CPU 1010 when the dialog processing system 1 is started, a program dependent on the hardware of the dialog processing system 1, and the like. The flexible disk (FD) drive 1072 reads a program or data from a flexible disk 1071 and provides the read program or data to the main memory 1050 or the hard disk 1074 through the I/O controller 1070.

As the optical disk drive 1076, for example, a DVD-ROM drive, a CD-ROM drive, a DVD-RAM drive or a CD-RAM drive can be used. In this case, it is required to use an optical disk 1077 corresponding to each of the drives. The optical disk drive 1076 can also read a program or data from the optical disk 1077 and provide the read program or data to the main memory 1050 or the hard disk 1074 through the I/O controller 1070.

A computer program to be provided to the dialog processing system 1 is provided by a user as stored in a recording medium such as the flexible disk 1071, the optical disk 1077 or a memory card. The computer program is installed and executed on the dialog processing system 1 by being read from the recording medium through the I/O controller 1070 or by being downloaded through the communication I/F 1040. Since operations that the computer program makes the information processor to execute are the same as those in the device already described, description thereof will be omitted.

The computer program described above may be stored in an external storage medium. As the storage medium, a magnetooptical recording medium such as an MD and a tape medium as well as the flexible disk 1071, the optical disk 1077 or a memory card, can be used. Moreover, the computer program may be provided to the dialog processing system 1 through a communication line by using, as a recording medium, a storage unit such as a hard disk or an optical disk library, which is provided in a server system connected to a dedicated communication line or the Internet.

Although the above example was mainly given of the dialog processing system 1, the same functions as those of the information processor described above can be implemented by installing a program having the functions described as in the case of the information processor on a computer and allowing the computer to function as the information processor. Therefore, the information processor described as one embodiment of the present invention can also be implemented by use of the method and the computer program.

The dialog processing system 1 of the present invention can be implemented as hardware, software or a combination thereof. As to implementation by the combination of hardware and software, implementation by use of a computer system having a predetermined program is cited as a typical example. In such a case, the predetermined program is loaded into the computer system and executed so as to allow the computer system to execute the processing according to the present invention. The program consists of command groups that can be expressed by an arbitrary language, code or notation. Such command groups enable the system to directly execute specific functions or to execute those functions after any one of or both of (1) conversion into another language, code or notation and (2) duplication onto another medium are performed. As a matter of course, not only such a program itself but also a program product containing a medium having the program recorded thereon is included in the scope of the present invention. The program for executing the functions of the present invention can be stored in an arbitrary computer-readable medium such as a flexible disk, a MO, a CD-ROM, a DVD, a hard disk unit, a ROM, an MRAM and a RAM. The program can be downloaded from another computer system connected through a communication line or can be duplicated from another medium for storage thereof in the computer-readable medium. Moreover, the program can also be stored in a single or a plurality of recording media by compression or division into a plurality of sections.

According to the present invention, it is possible to provide a dialog processing system, a dialog processing method and a computer program for extracting mandatory portions in utterances in a specific field from conversation data without requiring any previous knowledge regarding data and fields of application.

Although the embodiment of the present invention has been described above, the present invention is not limited thereto. Moreover, the effects described in the embodiment of the present invention are merely listed as preferred effects achieved by the present invention. The effects of the present invention are not limited to those described in the embodiment or example of the present invention.

Modified Embodiment

The present invention is not limited to the embodiment described above but various modifications and changes can be made, which are also included in the scope of the present invention.

(1) In the above embodiment, the description was given of the processing of extracting mandatory data for the sake of compliance by using utterance data obtained by converting voice data into a text format by use of the speech recognition system. However, the processing can be applied to an operation of conversion of voice data into a text format. As a result, only necessary portions can be efficiently transcribed and thus efforts required for transcribing the entire conversation are reduced. More specifically, portions corresponding to the utterance patterns of the present invention are recognized in all utterances. Then, a voice of each of the utterance portions assumed as the corresponding portions according to the present invention is listened to by using a distribution of utterance time. Thereafter, if the voice is the corresponding utterance, the utterance data is transcribed from the voice data and stored in the storage unit. After the transcriptions of the utterance data are accumulated in the storage unit by repeating the above processing, corresponding portions are recognized by applying the present invention using expressions common to the accumulated utterance data.

(2) In the above embodiment, the utterance data is generated by use of the speech recognition device according to a conversation between an agent and a customer over the phone. However, the present invention can also be applied to the case of, for example, a conversation with a deaf customer in sign language while using images shot by a camera such as a videophone. In such a case, the present invention can be implemented by use of utterance data manually produced from the conversation in sign language according to the photographed images.

The invention claimed is:

1. A dialog processing system comprising:
an utterance pattern input unit for inputting an utterance pattern which is an utterance structure derived from contents of field-independent general conversations;
an utterance data input unit for inputting a plurality of utterance data obtained by converting contents of a plurality of conversations in one field into a text format;
a target expression data extraction unit for extracting a plurality of target expression data from the plurality of utterance data inputted by the utterance data input unit, the target expression data each including a pattern matching portion which matches any of the utterance pattern inputted by the utterance pattern input unit;
a feature extraction unit for retrieving each of the pattern matching portions from the plurality of target expression data extracted by the target expression data extraction unit, and then for extracting a feature quantity common to some of the plurality of pattern matching portions; and
a mandatory data extraction unit for extracting mandatory data in the one field by use of the feature quantities extracted by the feature extraction unit, the mandatory data included in the plurality of utterance data inputted by the utterance data input unit.

2. The dialog processing system according to claim 1, further comprising:
a relaxed pattern generation unit for generating a relaxed pattern by use of the feature quantity extracted by the feature extraction unit; and
an utterance data evaluation unit for evaluating the plurality of utterance data by use of the relaxed pattern generated by the relaxed pattern generation unit, wherein
the conversations are through voice communications,
the utterance data input unit inputs the plurality of utterance data obtained by converting the conversations into a text format by use of speech recognition, and
the mandatory data extraction unit extracts the mandatory data in the one field from the plurality of utterance data according to the evaluation results obtained by the utterance data evaluation unit.

3. The dialog processing system according to claim 2, wherein the utterance data evaluation unit includes:
a calculation unit for calculating the numbers of appearances of the relaxed pattern by applying the relaxed pattern to the plurality of pattern matching portions, the plurality of target expression data except the plurality of pattern matching portions and the plurality of utterance data except the plurality of target expression data and a mandatory pattern generation unit for generating a mandatory pattern from the relaxed patterns according to the numbers of appearances calculated by the calculation part; and
wherein the mandatory data extraction unit extracts the mandatory data in the one field from the plurality of utterance data according to the mandatory patterns generated by the mandatory pattern generation part.

4. The dialog processing system according to claim 3, wherein the mandatory pattern generation unit generates the mandatory patterns from the relaxed patterns according to an expected value of the number of errors calculated by the formula, $$\frac{B}{A+B} \times C$$

where A denotes the number of appearances of the relaxed pattern in the plurality of pattern matching portions,
B denotes the number of appearances of the relaxed pattern in the plurality of target expression data except the plurality of pattern matching portions, and
C denotes the number of appearances of the relaxed pattern in the plurality of utterance data except the plurality of target expression data.

5. The dialog processing system according to claim 2, wherein the relaxed pattern generation unit generates the relaxed pattern by use of the feature quantity and a component word that constitutes the utterance patterns.

6. The dialog processing system according to claim 1, wherein the feature extraction unit extracts, as the feature quantity, at least any one of a word and an expression including the word, the word and expression included in the plurality of pattern matching portions and appearing a certain number of times or more.

7. The dialog processing system according to claim 1, wherein the feature extraction unit extracts the feature quantity by using a distribution of conversation times of the plurality of generated pattern matching portions.

8. The dialog processing system according to claim 1, wherein the feature extraction unit extracts a feature quantity common to the mandatory data in the one field by using, as the plurality of pattern matching portions, the mandatory data in the one field extracted by the mandatory data extraction unit.

9. The dialog processing system according to claim 1, wherein the mandatory data in the one field extracted by the mandatory data extraction unit is data that can be verified by an F measure calculated by the formula, $$2 \div \left(\frac{1}{P} + \frac{1}{R}\right)$$

where P denotes the precision of mandatory data in the one field, and
R denotes the recall of the mandatory data in the one field.

10. A computer program embodied in computer-readable memory comprising computer code for allowing a computer to execute the steps of:
inputting an utterance pattern which is an utterance structure derived from contents of field-independent, general conversations;
inputting a plurality of utterance data obtained by converting contents of a plurality of conversations in one field into a text format;

extracting, from the plurality of utterance data inputted, a plurality of target expression data each including a pattern matching portion which matches the inputted utterance patterns;

retrieving the pattern matching portions, respectively, from the plurality of target expression data extracted, and then extracting a feature quantity common to the plurality of pattern matching portions; and extracting mandatory data in the one field included in the plurality of utterance data inputted by use of the feature quantities extracted.

11. A dialog processing method comprising the steps of:

inputting utterance patterns which are utterance structures derived from contents of field-independent, general conversations;

inputting a plurality of utterance data obtained by converting contents of a plurality of conversations in one field into a text format;

extracting a plurality of target expression data including pattern matching portions which match the inputted utterance patterns from the plurality of utterance data inputted;

retrieving the pattern matching portions, respectively, from the plurality of target expression data extracted so as to extract feature quantities common to a plurality of the pattern matching portions; and extracting mandatory data in the one field included in the plurality of utterance data inputted by use of the feature quantities extracted.

* * * * *

UNITED STATES PATENT AND TRADEMARK OFFICE
CERTIFICATE OF CORRECTION

PATENT NO.         : 8,060,365 B2
APPLICATION NO.    : 12/167879
DATED              : November 15, 2011
INVENTOR(S)        : Nobuyasu Itoh et al.

It is certified that error appears in the above-identified patent and that said Letters Patent is hereby corrected as shown below:

In the Claims:

In claim 9, at column 2, line 53, please replace "+" with --÷--. A sample is shown below indicating the change.

Before (incorrect)

$$2 + \left( \frac{1}{P} + \frac{1}{R} \right)$$

After (correct) should read $$2 \div \left( \frac{1}{P} + \frac{1}{R} \right)$$

Signed and Sealed this
Third Day of January, 2012

David J. Kappos
*Director of the United States Patent and Trademark Office*